United States Patent [19]

Jost

[11] Patent Number: 4,513,996
[45] Date of Patent: Apr. 30, 1985

[54] TUBE COUPLING

[75] Inventor: Ralph Jost, Füllinsdorf, Switzerland

[73] Assignee: Hobas-Engineering AG, Switzerland

[21] Appl. No.: 384,003

[22] Filed: Jun. 1, 1982

[30] Foreign Application Priority Data

Jun. 17, 1981 [CH] Switzerland ............... 3990/81

[51] Int. Cl.³ ................................ F16L 17/02
[52] U.S. Cl. .................... 285/110; 285/369; 285/383
[58] Field of Search ............... 285/110, 235, 383, 369, 285/350

[56] References Cited

U.S. PATENT DOCUMENTS

| | | | |
|---|---|---|---|
| 1,515,613 | 11/1924 | Phillips | 285/369 X |
| 2,259,940 | 10/1941 | Nathan | 285/110 X |
| 2,615,741 | 10/1952 | Nathan | 285/369 X |
| 2,726,103 | 12/1955 | Slattery | 285/235 X |
| 3,177,015 | 4/1965 | Brown | 285/369 X |
| 3,430,989 | 3/1969 | Wendt | 285/235 X |
| 4,174,125 | 11/1979 | Wyss | 285/110 |
| 4,319,775 | 3/1982 | Bennett | 285/369 X |

FOREIGN PATENT DOCUMENTS

| | | | |
|---|---|---|---|
| 666956 | 7/1963 | Canada | 285/110 |
| 1202626 | 1/1960 | France | 285/235 |
| 456269 | 7/1968 | Switzerland | 285/110 |
| 430543 | 6/1935 | United Kingdom | 285/110 |

Primary Examiner—Thomas F. Callaghan
Attorney, Agent, or Firm—McGlew and Tuttle

[57] ABSTRACT

A tube coupling for coupling together one tube to another tube which have predetermined interior and exterior diameters comprises an outer sleeve which has an interior bore with a sealing element lining the bore of an elastic material. The sealing element has an exterior positively engaged sleeve and for this purpose advantageously includes exterior radially extending ribs which engage into dovetail radially extending grooves of the outer sleeve. The sealing element lining the bore of the tube is of an elastic material and it is formed substantially symmetrically in respect to its radial mid plane and includes at each end a plurality of inwardly directed sets of sealing protuberances following each other with cavities adjacent these protuberances into which the protuberances can be deflected by the engaged tube. In addition, the sealing element includes a central separating flange between the sets of protuberances which define an interior radially inwardly extending flange having an interior diameter substantially equal to the diameter of the associated tube to be connected. The flange forms an end wall at each end which provides a stop for each end of the tube to be connected. The axial length of the flange is a multiple of its radial height and the sealing element advantageously includes at least one substantially annular cavity defined therein in the vicinity of the flange to permit the material of the flange to be taken up by the cavity upon inward stressing by the coupled tubes.

6 Claims, 4 Drawing Figures

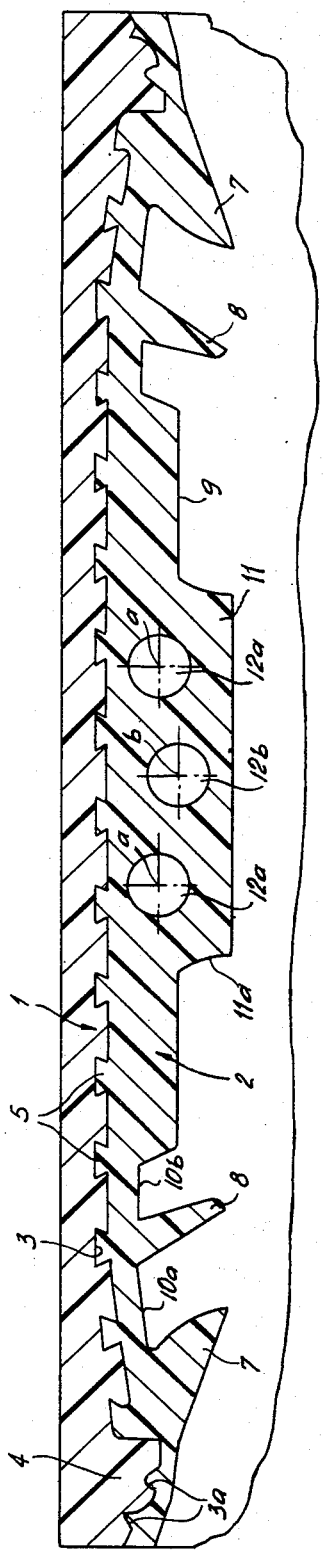
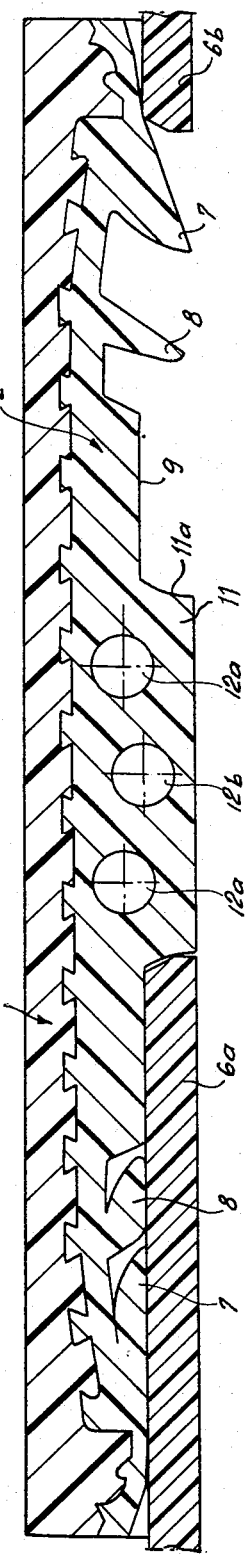

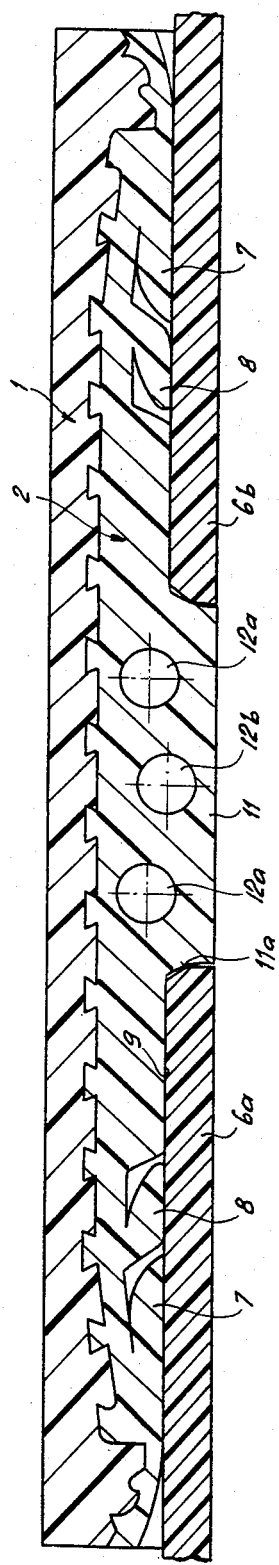
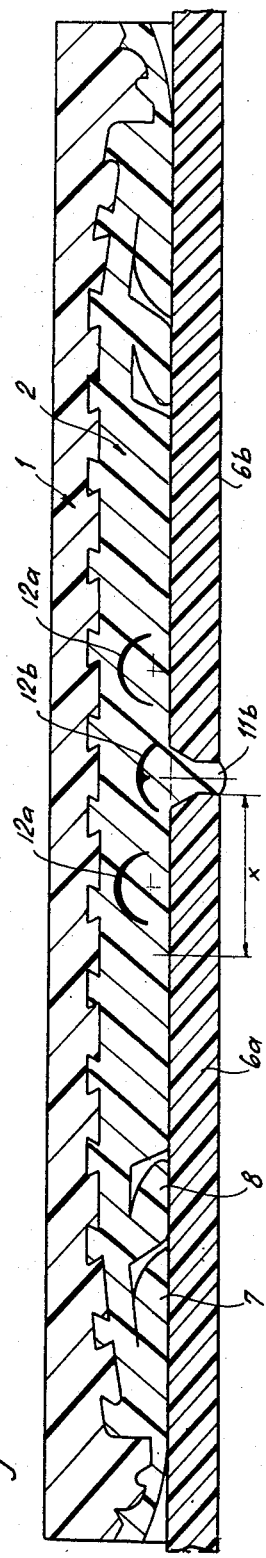
Fig. 3
Fig. 4

TUBE COUPLING

FIELD AND BACKGROUND OF THE INVENTION

This invention relates in general to the construction of tube couplings and in particular to a new and useful tube coupling for coupling together tubes and which includes an inner elastic lining permitting axial displacement of the coupled tubes within defined limits without breaking the sealing connection.

Tube couplings which are intended particularly for connecting large-size, glass fiber reinforced plastic tubes, such as laid underground, are known for example, from Swiss Pat. No. 600228 and have proved very satisfactory in service. The inside contour or profile of the sealing element provided with suitable protuberances and/or sealing lips usually comprise an axially short separating flange extending lengthwise in the middle and having an inside diameter corresponding to that of the tubes to be connected, and serving as a stop for the mostly bevelled front faces of the tubes.

Experience has shown that under certain loading conditions which, for example, tend to buckle the tubes at the joint or to push them together, the tubes or the connecting sleeve may break or the sealing element may be damaged and cause leaks. This particularly applies to displacements caused by tectonic earth motions or forces of similar effect. Especially in earthquake zones, underground jointed tubes may be exposed to forces which push them axially against each other and which cannot be absorbed by the elasticity of the tube or connecting sleeve nor by the static friction between the tube and the sealing element

SUMMARY OF THE INVENTION

The present invention is directed to a tube coupling capable of taking up even relatively strong axial forces acting oppositely on the connected tubes, without suffering destruction or becoming leaky.

In accordance with the invention the tube coupling comprises an outer connecting sleeve and an inner sealing element of elastic material which is positively engaged in the interior bore of the sleeve, for example by radially extending ribs which extend into dovetail grooves of the outer connecting sleeve. The sealing element is symmetrically formed in respect to its radial mid plane and includes a central flange portion having an interior diameter substantially equal to the interior diameter of one of the tubes to be joined and a radial extent substantially equal to the thickness of the tubes so that each end of the central flange portion forms an abutment or stop for a tube end. In addition, the sealing element includes a plurality of inwardly projecting sealing protuberances or lips which follow each other in an axial direction with cavities adjacent each sealing protuberance into which they may be deflected by an engaged tube. The sealing element also includes one or more cavities defined in the portion thereof defining the flange so that the material of the flange may be absorbed into the cavities upon the exertion of an axial end pressure by an engaged tube which is coupled.

Advantageously, the annular cavities extending in the separating flange symmetrically relative to the radial mid plane thereof have a circular cross section. The radius at which the cavities extend is advantageously about equal to or larger than, half the sealing element diameter at the base of the separating flange, which diameter corresponds to that of the tubes to be connected to each other. Due to this provision, upon an impact pushing the tubes against each other, the flange material set under pressure by the front faces of the tubes is displaced radially outwardly and progessively closes the cavities, so that an inward displacement of the material, by which the area of passage in the tubes would be reduced, is avoided. Of course, the total volume of the cavities, advantageously distributed into three annular cones, for example, is chosen sufficiently large to be capable of taking up the material of the separating flange which is displaced under the axial pressure of the tubes end or ends. Preferably, the arrangement is such that the cavities are filled up, i.e, a further penetration of the tube end or ends due to material displacement is substantially prevented, before the tube ends reach the mid plane of symmetry. This means that at the end of the displacement of the tubes, with the ends pushed together, at least a narrow portion of the separating flange remains therebetween, so that the tubes cannot butt against each other.

An object of the invention is to provide a tube coupling which includes a sleeve member having an interior lining which is formed symmetrically and which includes a central separating flange forming end abutments for each end of a tube to be coupled and with sealing protuberances which are deflected by engagement of the coupled tube into recesses formed in the sealing element and which further includes at least one cavity in the flange portion of the sealing element to absorb the material of the flange upon exertion of end pressures by the coupled tubes against the flange.

A further object of the invention is to provide a tube coupling which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is an axial sectional view of the wall of a tube coupling constructed in accordance with the invention;

FIGS. 2 and 3 are similar views taken after inserting one or more ends, respectively, of the tubes to be connected, into their normal coupled position; and FIG. 4 is a view similar to FIG. 1 showing an extreme situation after the two tubes have been forced against each other.

DESCRIPTION OF THE PREFERRED EMBODIMENTS

Referring to the drawings in particular the invention embodied therein comprises a tube coupling for coupling together one tube 6a with another tube 6b. The shown coupling comprises a cylindrical sleeve 1 of glass-reinforced plastic, lined over its entire length with a sealing element 2 which is made of an elastic material such as rubber or plastic and designed with a profile which is symmetrical relative to the radial mid plane of the element. To anchor the tubular sealing element 2 to sleeve 1, the central portion of the sleeve is provided on its inside with dovetail grooves 3. The end portions of sleeve 1 are slightly constructed and terminate in an outwardly flaring radially inwardly directed annular flange 4 provided with circular grooves 3a on its inside (periphery). The outer surface of sealing element 2 is exactly conformable to the inner surface of sleeve 1, i.e. provided with ribs 5 which engage grooves 3 and 3a. Starting from an inside diameter of sealing element 2 slightly larger than the outside diameter of the tubes 6a and 6b to be connected, and considered from each of the sleeve ends inwardly, a relatively broad (axially) circular protuberance 7 and a relatively narrow, sealing lip 8 project from element 2 inwardly, and extend obliquely toward the radial mid plane of the coupling. Radial recesses 10a and 10b are thus formed between protuberance 7 and lip 8 and between lip 8 and an inwardly adjacent cylindrical portion 9 having an interior diameter corresponding to the outside diameter of the tubes 6a and 6b to be coupled together. Extending between the two axially spaced cylindrical portions 9 is a cylindrical separating flange 11 projecting into the interior by an amount of the wall thickness of the tubes 6a and 6b to be coupled together. The axial length of separating flange 11 is a multiple of its radial height. As shown particularly clearly in FIG. 1, the flanks 11a of separating flange 11 are rounded or bevelled at the transition to the cylindrical portion. In the zone of separating flange 11, sealing element 2 is provided with a plurality, three in the shown example, of annular cavities 12a, 12b having a circular cross section. The radius of the cross-sectional axis b of central annular cavity 12b is approximately equal to that of cylindrical portions 9, while the radius a of the other two annular cavities 12a is somewhat larger. This makes sure that a larger volume of cavities 12a extends radially outwardly of cylindrical portions 9, and that the thickness of the material webs remaining between cavities 12a, and flanks 11a and the cylindrical surface of separating flange 11 and central cavity 12b exceeds the radial spacing of central cavity 12b from the cylindrical surface of separating flange 11. It has been found particularly advantageous if the thickness of these webs is equal or only slightly smaller than the cross-sectional diameter of cavities 12a and 12b, with the radial spacing of central cavity 12b being substantially smaller.

The tubes 6a and 6b to be connected to each other and having an outer diameter substantially corresponding to that of cylindrical portions 9, and an inside diameter corresponding to that of the cylindrical surface of separating flange 11, are introduced one after the other (FIGS. 2 and 3) until their bevelled front edges butt against flanks 11a of separating flange 11. In a well known manner, the elastic deformation thereby caused of protuberances 7 and lips 8 of the sealing element, which of course requires adequate pushing forces, ensures a firm and tight connection between the tubes 6a and 6b and the coupling.

If tubes 6a and 6b thus connected experience oppositely directed impacts such as may occur during an earthquake or similar earth movements and which usually involve forces many times stronger than those necessary for introducing the tubes into the coupling, the forces are transmitted through the front edges of tubes 6a and 6b, to flanks 11a of separating flange 11 and cause a displacement of the material of separating flange 11 into annular cavities 12a and 12b. The total displaced material volume depends on the volume of the cavities and is chosen to ensure that upon a maximum possible filling of cavities 12a and 12b (while taking into account the volume of the enclosed and compressed air), the two tube ends do not come into contact completely but remain separated from each other by a separating rib 11b (FIG. 4) extending between the front edges of the tubes. This result is obtained by providing central cavity 12b close to the surfcace of the separating flange.

The maximum possible displacement of a tube upon an impact as mentioned, without damage to the tube or the coupling, is shown at x in FIG. 4. It is evident that the axial resistance of separating flange 11 opposing the displacement of material into the cavities and effective in addition to the friction of the tube within the sealing element, may be utilized to absorb quite considerable impact forces. A tube coupling is thereby obtained which remains perfectly tight and undamaged even upon a relative strong axial push on the tubes.

As a specific example, a coupling for tubes having a diameter of 600 mm may be considered. The axial length of separating flange 11 is about 60 mm and the three annular cavities 12a and 12b have a cross-sectional diameter of about 11 mm. The inside profile of sealing element 2 is of such design that a force of about 600 kilograms is needed to introduce tubes 6a and 6b into the coupling up to flanks 11a of separating flange 11. To push these tubes farther inwardly through a distance x, and thus narrowing the spacing therebetween to a gap of about 5 mm filled by separating rib 11b, a force of about 4,200 kilograms would be necessary in this example. This means that the coupling is capable of taking up axial impacts on the tubes of this order of magnitude, without being destroyed or becoming leaky. An axial length of the separating flange about 5 to 7 times its radial height has proved advantageous.

Even though three annular cavities having a circular cross-section have proved particularly advantageous, a larger number of cavities, such as five, may also be provided, even with unequal cross-sections or with cross-sections of different shape. The prerequisite, of course, is to provide cavities suitably spaced from each other in the axial direction and of such volume that upon an impact by which the tubes are pushed toward each other the whole maximum way, they are capable of taking up the displaced material of the separating flange substantially to an amount completely filling the volume, without any flange portion adjacent the cavities being ruptured or torn off. As a matter of course, the inventive coupling is also capable of absorbing in the same way impact forces which would act on the tubes in a slightly non-axial direction.

While specific embodiments of the invention have been shown and described in detail to illustrate the application of the principles of the invention, it will be understood that the invention may be embodied otherwise without departing from such principles.

What is claimed is:

1. A tube coupling for coupling together one tube to another tube having predetermined interior and exterior diameter, comprising an outer sleeve having an interior bore, a sealing element lining said bore of an elastic material having an exterior positively engaged with said sleeve in its bore and having an interior formed substantially summetrically in respect to its radial mid plane and including at each end a plurality of inwardly directed sets of sealing protuberances following each other with cavities adjacent each protuberance into which it may be deflected by an engaged tube, and a central separating flange between said sets of sealing protuberances defining an interior flange wall of a diameter substantially equal to the interior diameter of the associated tube to be coupled and having an end wall at each axial end of said flange forming a tube end stop, the axial length of said flange being a multiple of its radial height, said sealing element having at least one substantially annular cavity defined therein in the vicinity of said flange for taking up the material of the flange upon stressing of the flange by the inward pressure of the coupled tubes.

2. A tube coupling according to claim 1, wherein said at least one substantially annular cavity comprises three separate annular cavities having circular cross sections including a middle one located in the central portion of said flange having a diameter which is smaller than the diameter of the others.

3. A tube coupling according to claim 1, wherein said sealing element includes a central cylindrical portion embodying said flange with an end portion at each end of said flange of a diameter corresponding to the outside diameter of the two tubes to be coupled, wherein said at least one cavity comprises a plurality of cavities having diameters at least equal to the diameter of said central cylindrical portion.

4. A tube coupling according to claim 3, wherein said cavities have a volume which is slightly smaller than the material volume of said flange.

5. A tube coupling according to claim 1, wherein each end of said flange is rounded.

6. A tube coupling for coupling two tubes together, each tube having an interior diameter and an exterior diameter, comprising:

an outer sleeve having an interior bore with a diameter greater than the exterior diameter of the tubes;

a sealing element lining said interior bore and made of elastic material, said sealing element having an exterior positively engaged with said interior bore of said outer sleeve and having an interior formed substantially symmetrically in respect to a radial mid-plane passing radially through said sealing element;

said sealing element having a plurality of axially spaced inwardly extending sealing protuberances on each side of said mid-plane, each protruberance inclined toward said mid-plane and being followed, in a direction toward said mid-plane, by a cavity having a diameter greater than the exterior diameter of the tubes and of a size to receive each sealing protuberance respectively when a tube is engaged over said sealing protuberances, each protuberance having a diameter smaller than the exterior diameter of the tubes;

said sealing element having a central separating flange containing said mid-plane and separating said plurality of sealing protuberances on each side of said mid-plane, said central separating flange having an axial length which equals a plurality of radial widths of said central separating flange, said central separating flange having opposite axially spaced bevelled flanks against which the tubes are engaged for coupling the tubes together, said central separating flange having an interior diameter which is substantially equal to the interior diameter of the tube, said flange including a central annular cavity having a diameter greater than the interior diameter of the tubes, said flange having at least one additional annular cavity spaced axially from said central annular cavity on either side of said midplane, each additional annular cavity having a diameter greater than the diameter of said central annular cavity, said central and additional annular cavities having a combined volume substantially equal to a volume of material from said flange which would be deformed into said central and additional cavity upon movement of the tubes together and over said flange upon the occurrence of excessive axial forces on the tubes; and said sealing element including a cylindrical portion adjacent each flank of said flange, each cylindrical portion having an outer diameter substantially equal to the exterior diameter of the tubes;

whereby the tubes are coupled together by engaging said flanks of said flange during normal coupling, and the tubes upon receiving large axial forces moving the tubes together, engage over said bevelled flanks and onto said flange to deform material of said flange into said central and additional annular cavities.

* * * * *